Dec. 5, 1933.   M. STUBNITZ   1,938,561
CUSHION SEAT FOR AUTOMOBILES AND THE LIKE
Filed July 7, 1931   2 Sheets-Sheet 1
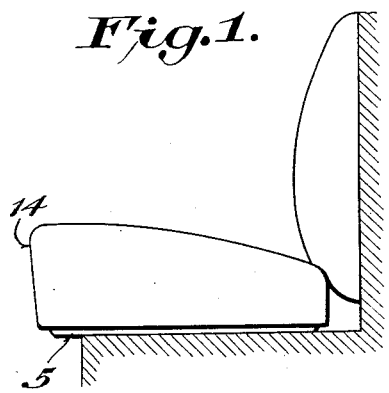
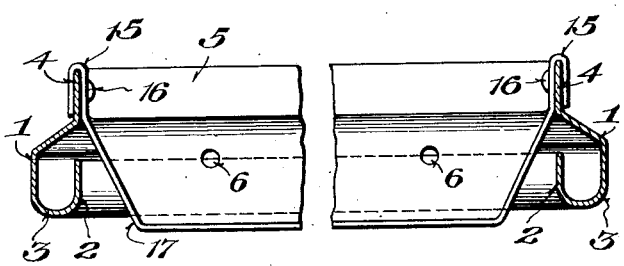
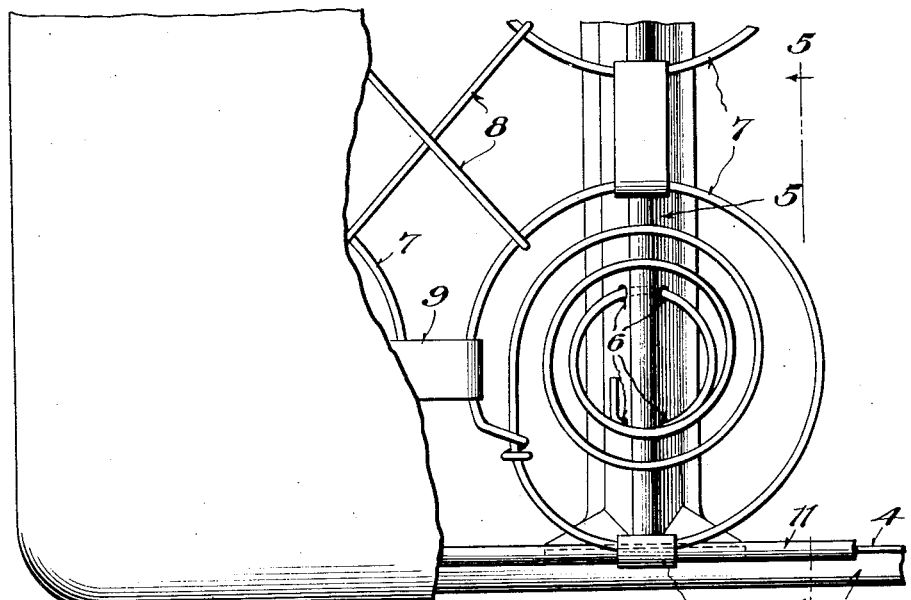
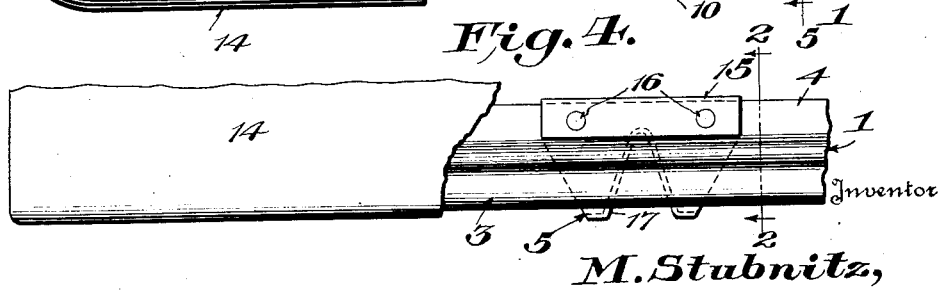
Inventor
M. Stubnitz,
By K. P. McElroy
Attorney

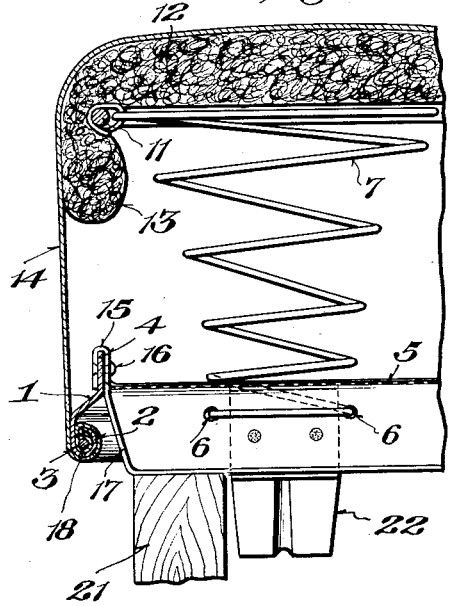
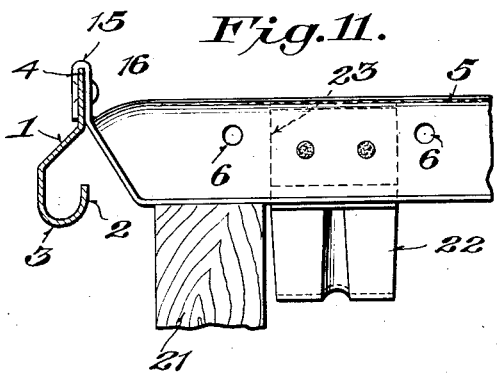
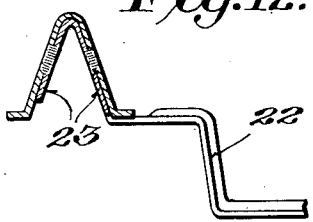
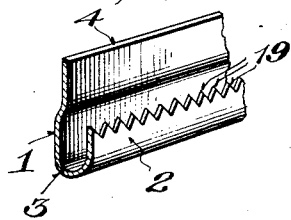
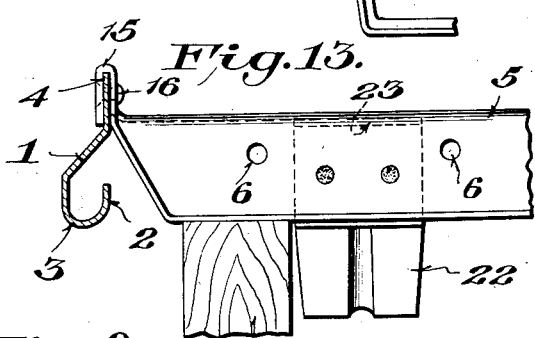
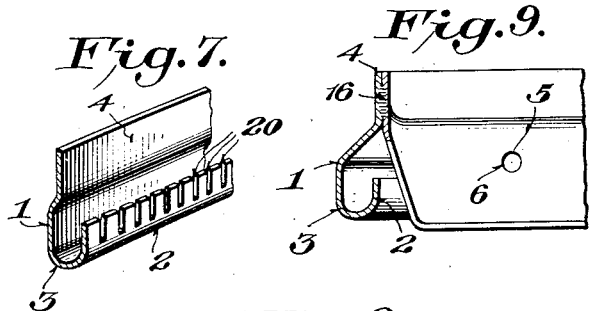
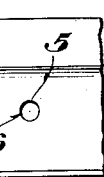
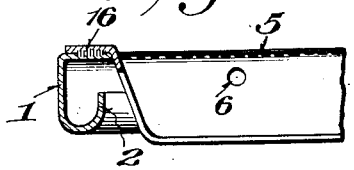
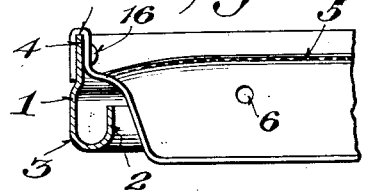

Patented Dec. 5, 1933

1,938,561

UNITED STATES PATENT OFFICE 1,938,561

CUSHION SEAT FOR AUTOMOBILES AND THE LIKE

Maurice Stubnitz, Pittsburgh, Pa., assignor to Fort Pitt Bedding Company, Pittsburgh, Pa., a corporation of Pennsylvania Application July 7, 1931. Serial No. 549,239

3 Claims. (Cl. 155—180)

This invention relates to cushion seats for automobiles and the like; and it comprises a cushion seat having a lower metallic border frame, an upper border frame, spring supporting bars or slats bridging opposite sides of the lower border frame, coil springs supported by said slats and tied to the upper border frame and to each other and a covering embracing the upper and lower frames, such lower frame being provided with an inwardly turned edge for receiving and retaining the lower portion of the cover and arranged to support the slats in such position that the cushion may rest on the seat support solely through means of said slats; all as more fully hereinafter set forth and as claimed.

The provision of a strong durable cushion seat for use in automobiles, etc., comprising a small number of parts, inexpensive in manufacture and to which a covering may be quickly and easily secured is a desideratum in this art. In an attempt to meet these requirements cushioned seats with frames of wood, of metal and of both wood and metal have been proposed. Seats having frames of wood are usually expensive in manufacture, usually bulky, usually require the use of tacks, brads or the like for holding the upholstery and covers in place and are not particularly rigid in construction. Composite seats of both metal and wood are unsatisfactory compromises and usually consist of a large number of parts which are difficult to assemble. And the metal seats heretofore proposed, so far as I am aware, have been subject to certain disadvantages. Among these disadvantages is that a relatively large number of parts are used for supporting the springs and securing the upholstery in place on the frame. In these prior arrangements, the upholstery is usually attached in such a way that metal parts are exposed or the construction is such that the seat rests on its support at points of attachment of the upholstery or cover, with the result that the cover is abraded and soon wears through.

It is an object of the present invention to provide a rigid, strong, all-metallic seat frame consisting of relatively few parts, all arranged in such a way that without sacrificing rigidity or simplicity of construction the frame of the seat may engage the support upon which it rests through contact only with its spring supporting slats, with the result that the seat cover which encloses the frame is not abraded through contact with such support, and the cover is secured in position in such a way that no metallic parts are exposed to view.

With these and other objects in view, my invention consists of upper and lower frames with coil or other springs therebetween supported at their lower ends on slats bridging opposite sides of the lower border frame, together with an arrangement of the lower border frame permitting easy and firm securing of the cover in such position that it completely embraces the top and sides of the seat and is held out of contact with the seat support, this being accomplished by shaping the lower border frame in a particular way. The upper part of the lower frame may extend vertically or horizontally and is arranged to cooperate with ends of the spring supporting slats. This upper portion is offset to extend inwardly. The lower portion of the border frame is bent inwardly—substantially U-shaped—in order that the lower edge of the cover may be brought down over the outer face of such frame, tucked in the U-shaped portion and held there by rolling said portion upon itself or by bending, swagging or otherwise forcing the extreme lower edge of the lower border frame against the cover. According to this arrangement the cover only contacts with the lower portion of the outside of the border frame and at higher points is spaced away so that when the seat is compressed in use the side walls do not flap against a substantial portion of the lower border frame and thus cause disagreeable noise and wear.

In the accompanying drawings I have shown several forms of a specific embodiment of my invention.

Fig. 1 is a diagrammatic side elevation showing the cushion seat in place on its support;

Fig. 2 is a vertical section along line 2—2 of Fig. 4;

Fig. 3 is a top plan segmental view with the cover partly removed to show one of the slats, a coil spring and the top of a lower border frame;

Fig. 4 is a front view of Fig. 3;

Fig. 5 is a vertical section along 5—5 of Fig. 3 looking in the direction of the arrows and to which has been added a section of the seat support;

Fig. 6 is a detail segmental perspective of one form of lower border frame;

Fig. 7 is a similar view of another form;

Figs. 8, 9 and 10 are detail segmental perspectives showing different forms of lower border frame and means for attaching the slats thereto;

Fig. 11 is a longitudinal section through one form of lower border frame showing the spring supporting slat in elevation and illustrating how the slat rests on the seat support;

Fig. 12 is a section through a spring supporting slat and the stop, and illustrates how such stop is attached to the slat; and Fig. 13 is a view similar to Fig. 11 showing the spring supporting slat on a level with the lower portion of the lower border frame.

Referring to the drawings in which similar reference numerals designate corresponding parts throughout the several views, 1 is the sheet metal lower border frame having along its lower edge the inwardly and upwardly extending section 2 resulting in a substantially U-shaped pocket 3. The top or upper portion of the lower border frame is offset or bent inwardly as at 4 and may extend vertically as shown in Figs. 2, 5, 6, 7, 8, 9, 11 and 13, or horizontally as shown in Fig. 10. Opposite sides of this lower border frame are bridged by spring supporting bars or slats 5 provided at intervals along their lengths with perforations 6 for the reception and retention of the lowermost coil of the coil springs 7 which extend upwardly to the top of the cushion and which are tied together by tie-wires 8 and clips 9. At their tops the springs are attached by means of clips 10 to an upper border frame of stout wire 11 and on this wire is supported the usual padding 12 extending below the upper border frame as shown at 13. Embracing the upholstery or padding 12 is the cover 14 which extends downwardly, contacting with the outer face of the border frame 1, but not contacting with the upper portion 4. The cover is secured in place as hereinafter described.

The spring supporting slats 5 are provided at their extremities with means cooperating with the holding means of the lower border frame. When the lower border frame has the upward extension 4 the spring supporting slats are provided with hooked ends 15 which may be riveted, spot-welded or otherwise firmly secured to the lower border frame as clearly shown in Figs. 2, 5, 8, 11 and 13. Instead of providing hooked ends for such slats they may have flat faces at either end which may be riveted or spot-welded to the upper portion of the lower border frame as shown in Fig. 9. The fastening means, whether spot-welds or rivets, through the several views are indicated by the reference numeral 16. In still another form the extremities of the slats may be provided with substantially horizontal extending ends and the lower border frame with an inwardly extending horizontal support to which the slat may be riveted or welded as indicated in Fig. 10.

After the parts are assembled so far as described the cover is placed over the frame and its lower edge inserted in the pocket 3 of the lower border frame. By means of a tool the lower edge 2 of the border frame is forced inwardly and rolled upon itself to grip the cover and to facilitate such gripping the lower edge of the border frame may be provided with serrations 19 in Fig. 6 or provided with a plurality of tangs 20 as illustrated in Fig. 7. When the pocket 3 of the lower border frame is spaced away from the slat as shown in the several views, the clamping tool for bending or rolling the lower edge of the border frame inwardly may be conveniently used along the entire length of the lower border frame.

In Fig. 2 the height of the lower border frame and the height of the slat are so correlated that the lower edge of the slat 17 extends below the bottom of the pocket 3 of the lower border frame, whereby the seat may be supported on the seat supports as illustrated in Fig. 1 and Fig. 5. Reference numeral 21 indicates the seat support while reference numeral 22 indicates a stop attached to the slats in a definite position and arranged so that the seat may be positioned on the support with the stop 22 anchoring it. The stop 22 is illustrated in Fig. 12 as being made of reinforced metal having a V-shaped extension 23 which fits inside the spring supporting slats and which may be riveted or welded thereto. Advantageously such stop is attached to say two of the slats. Fig. 11 illustrates a lower border frame extending below the bottom of the spring supporting slat and illustrates how under such conditions the seat may be placed on the support 21 without there being contact between the lower border frame and the support. Fig. 13 illustrates how the seat may be supported solely through the slats when the bottom of the lower border frame and the lower edges of the slats are in the same plane.

Cushion seats having lower and upper border frames with coil springs therebetween with means for attaching upholstery and for securing the cover to the lower border frame are known in this art. Usually such constructions involve special clips or the like for holding the covering to the lower border frame. Where wood is employed tacks or the like are necessary, and usually in such constructions, when the lower border frame itself is used to hold the covering in place, the metal parts are exposed, the covering not completely embracing the lower border frame; nor in such constructions is there provision for preventing flapping of the side walls of the cushion against the frame. In the present invention the lower border frame constitutes the means for supporting the slats and for holding the cover in place without the addition of a separate element and because of the shape of this lower border frame the cover only contacts on the outside throughout a small area. This is due to the offset portion 4.

In accordance with the present invention it is not necessary to supply a bead or the like at the lower end of the cover, although the pocket 3 is well adapted to hold such a bead and this construction has been illustrated in Fig. 5 where reference numeral 18 indicates the bead in the lower edge of the cover. This bead may be formed by rolling the cover on itself or by inserting a piece of fabric, a small wire, cord or the like.

The seat as described is extremely simple in construction, comprising a small number of parts and when assembled is especially strong and durable; is an all-metallic seat which may be made of rolled or stamped metal, all parts of which are covered by the upholstery, which is so held in place that it does not come in contact with the seat support and is therefore not abraded or disfigured.

What I claim is:

1. In a cushion seat or the like a lower border frame having a vertical wall provided with a lower inturned edge forming a bead and an extended offset vertical top edge, spring supporting cross bars connecting opposite sides of said border frame and hooked over the top vertical edge of the border frame, and a seat cover passing down the outside of said border frame, around the bottom thereof and into the bead formed by said inturned edge, said cover being clamped by and within said bead.

2. A lower border frame for use with cushion seats and the like comprising a vertical outside wall having its lower edge turned inwardly to form a pocket for the reception of the edges of a seat cover and an inwardly, offset vertical portion at its upper extremity adapted to support a series of cross bars, said pocket being provided with an edge for engagement with said cover to clamp the edges of the cover securely within the pocket.

3. In a cushion seat or the like, a lower border frame reinforced by a plurality of spring-supporting cross bars, and having a vertical wall provided with a lower inturned edge forming a bead and an extended inwardly bent top portion, the spring-supporting cross bars connecting sides of said border frame and secured to the inwardly bent top portion, and a seat cover passing down the outside of said border frame, around the bottom thereof and into the bead formed by said inturned edge, said cover being permanently clamped by and within said bead.

MAURICE STUBNITZ.